US012792364B2

(12) United States Patent
Kurosawa

(10) Patent No.: US 12,792,364 B2
(45) Date of Patent: Nov. 10, 2026

(54) MANAGEMENT SYSTEM AND MANAGEMENT METHOD

(71) Applicant: Yokogawa Electric Corporation, Tokyo (JP)

(72) Inventor: Nanako Kurosawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 24 days.

(21) Appl. No.: 18/849,195

(22) PCT Filed: Mar. 22, 2023

(86) PCT No.: PCT/JP2023/011097
§ 371 (c)(1),
(2) Date: Sep. 20, 2024

(87) PCT Pub. No.: WO2023/189888
PCT Pub. Date: Oct. 5, 2023

(65) Prior Publication Data
US 2025/0199820 A1 Jun. 19, 2025

(30) Foreign Application Priority Data
Mar. 31, 2022 (JP) ................................ 2022-059836

(51) Int. Cl.
*G06F 9/445* (2018.01)
*G05B 19/418* (2006.01)

(52) U.S. Cl.
CPC ....... *G06F 9/44505* (2013.01); *G05B 19/418* (2013.01)

(58) Field of Classification Search
CPC .......................... G05B 19/418; G06F 9/44505
See application file for complete search history.

(56) References Cited

U.S. PATENT DOCUMENTS

2002/0175434 A1* 11/2002 Uehara .................. B29C 48/92 264/40.5
2015/0032256 A1 1/2015 Hashiguchi et al.
2018/0117765 A1* 5/2018 Inaba ................ G05B 19/4183
2021/0025687 A1* 1/2021 Ichikawa ............... G01B 7/107
(Continued)

FOREIGN PATENT DOCUMENTS

JP S60177202 A 9/1985
JP H111888 A 1/1999
(Continued)

OTHER PUBLICATIONS

International Search Report (ISR) dated May 16, 2023 filed in PCT/JP2023/011097.
(Continued)

*Primary Examiner* — Terrell S Johnson
(74) *Attorney, Agent, or Firm* — RANKIN, HILL & CLARK LLP

(57) ABSTRACT

A management system includes: a plurality of devices constituting a measurement system; an acquisition unit that acquires information of an identification ID and an arrangement place of each of the plurality of devices; and a system configuration setting unit that changes device setting of at least one of the plurality of devices based on an acquisition result of the acquisition unit.

9 Claims, 6 Drawing Sheets

(56) References Cited

U.S. PATENT DOCUMENTS

| | | | |
|---|---|---|---|
| 2021/0157305 | A1 | 5/2021 | Ratilla |

FOREIGN PATENT DOCUMENTS

| | | | |
|---|---|---|---|
| JP | 2018073272 | A | 5/2018 |
| JP | 2019164542 | A | 9/2019 |

OTHER PUBLICATIONS

Japanese Office Action (JPOA) dated Apr. 23, 2024 for Japanese Application No. 2022-059836; English Translation.
Extended European Search Report (EESR) dated Mar. 4, 2026 for European Patent Application No. 23779902.8.
Korean Office Action dated Jul. 21, 2026 for Korean Patent Application No. 10-2024-7032096; English machine translation.

* cited by examiner

FIG.3

DATABASE 441

| IDENTIFICATION ID | ARRANGEMENT PLACE | DEVICE SETTING | OTHER INFORMATION |
|---|---|---|---|
| FRAME DEVICE 2-1 | XXX | XXX | FRAME TYPE, MOTOR TYPE, AND THE LIKE |
| | XXX | XXX | |
| | XXX | XXX | |
| | ... | ... | |
| SENSOR DEVICE 3-1 | XXX | XXX | RADIATION SOURCE TYPE, PRESENCE OR ABSENCE OF TEMPERATURE CONTROL, AND THE LIKE |
| | XXX | XXX | |
| | XXX | XXX | |
| | ... | ... | |
| FRAME DEVICE 2-2 | ... | ... | ... |
| SENSOR DEVICE 3-2 | ... | ... | ... |
| ... | ... | ... | ... |

FIG.6

DATABASE 541

| MEASUREMENT SYSTEM | IDENTIFICATION ID | ARRANGEMENT PLACE | DEVICE SETTING | OTHER INFORMATION |
|---|---|---|---|---|
| MEASUREMENT SYSTEM MS-1 | FRAME DEVICE 2-1 | XXX | XXX | FRAME TYPE, MOTOR TYPE, AND THE LIKE |
| | | XXX | XXX | |
| | | XXX | XXX | |
| | | … | … | |
| | SENSOR DEVICE 3-1 | XXX | XXX | RADIATION SOURCE TYPE, PRESENCE OR ABSENCE OF TEMPERATURE CONTROL, AND THE LIKE |
| | | XXX | XXX | |
| | | XXX | XXX | |
| | | … | … | |
| | FRAME DEVICE 2-2 | … | … | … |
| | SENSOR DEVICE 3-2 | … | … | … |
| | … | … | … | … |
| MEASUREMENT SYSTEM MS-2 | … | … | … | … |
| | … | … | … | … |
| | … | … | … | … |
| MEASUREMENT SYSTEM MS-3 | … | … | … | … |
| | … | … | … | … |
| | … | … | … | … |
| … | … | … | … | … |

MANAGEMENT SYSTEM AND MANAGEMENT METHOD

FIELD

The present invention relates to a management system and a management method.

BACKGROUND

For example, as disclosed in Patent Literature 1, it is known that a sensor device mounted in a frame device for measuring a sheet is replaced.

CITATION LIST

Patent Literature

Patent Literature 1: JP H11-1888 A

SUMMARY

Technical Problem

Conventionally, device setting of a frame device or a sensor device has been manually changed each time the sensor device is replaced. Therefore, a large workload accompanies the device setting.

One aspect of the present invention enables a reduction in a workload accompanying device setting.

Solution to Problem

According to one aspect, a management system includes a plurality of devices constituting a measurement system, an acquisition unit that acquires information of an identification ID and an arrangement place of each of the plurality of devices, and a system configuration setting unit that changes device setting of at least one of the plurality of devices based on an acquisition result of the acquisition unit.

According to one aspect, a management method includes acquiring information of an identification ID and an arrangement place of each of a plurality of devices constituting a measurement system, and changing device setting of at least one of the plurality of devices based on an acquisition result.

Advantageous Effects of Invention

According to the present invention, a workload accompanying device setting can be reduced.

BRIEF DESCRIPTION OF DRAWINGS

FIG. 3 illustrates an example of a database 441.

FIG. 6 illustrates an example of a database 541.

DESCRIPTION OF EMBODIMENTS

Figure 1:
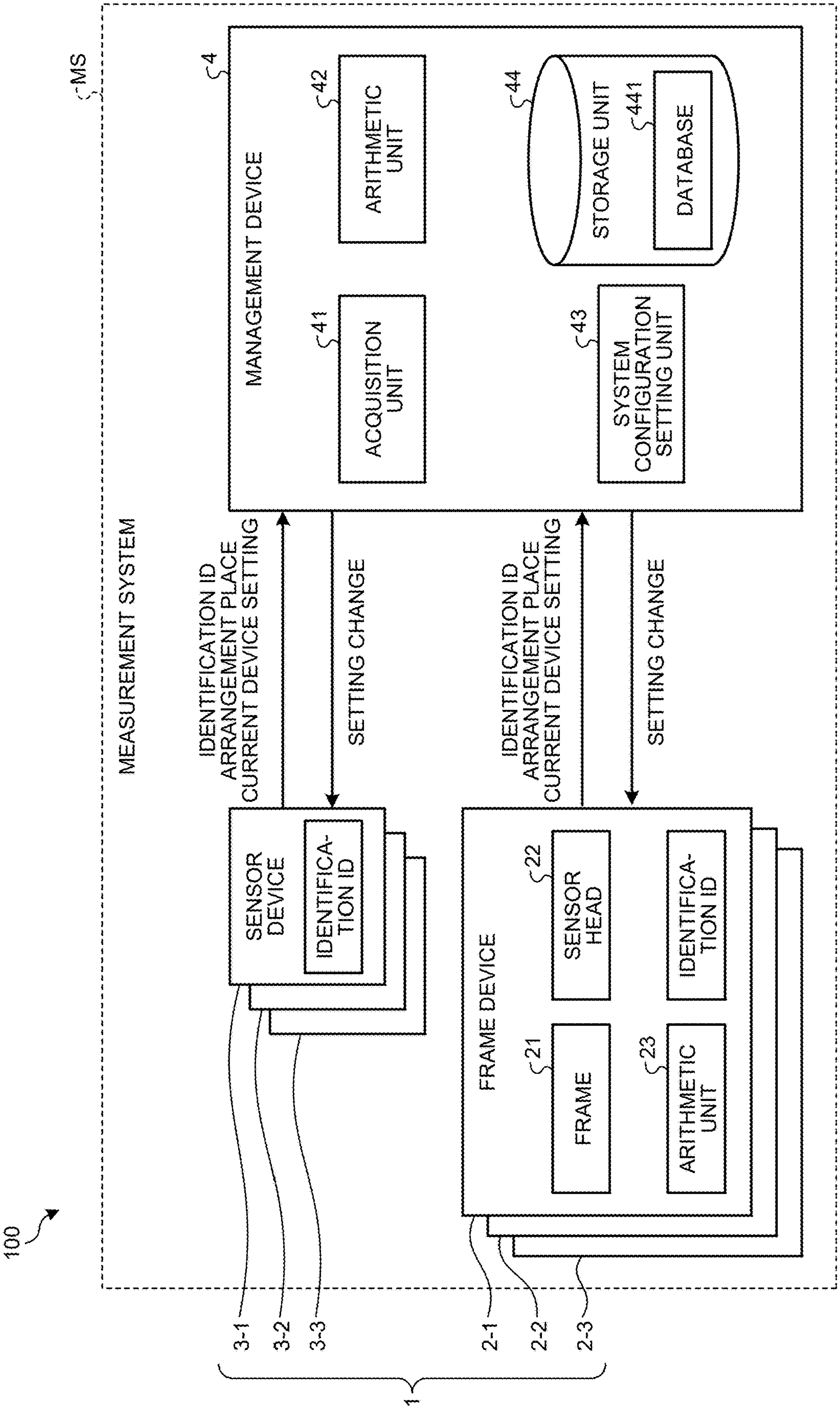
FIG. 1 illustrates an example of a schematic configuration of a management system 100 according to an embodiment.

An embodiment will be described below with reference to the drawings. The same elements are denoted by the same reference numerals, and redundant description will be appropriately omitted.

FIG. 1 illustrates an example of a schematic configuration of a management system 100 according to the embodiment. The management system 100 includes a plurality of devices 1 and a management device 4. The plurality of devices 1 constitutes a measurement system MS.

The plurality of devices 1 includes one or more frame devices 2 and one or more sensor devices 3. FIG. 1 illustrates three frame devices 2 and a plurality of three sensor devices 3. The frame devices 2 are illustrated as frame devices 2-1 to 2-3 so as to be distinguished from each other. The sensor devices 3 are illustrated as sensor devices 3-1 to 3-3 so as to be distinguished from each other.

Identification IDs are assigned to the plurality of devices 1. The identification IDs are represented by, for example, a character string, a numerical string, or the like. The identification IDs may include a model name. The devices 1 have the identification IDs. For example, the identification IDs are stored in storage units inside the devices 1, or included in the appearances of the devices 1. In the latter case, one-dimensional or two-dimensional bar codes and the like such as character strings indicating identification IDs may be provided on the outer surfaces of the devices 1.

In the embodiment, the measurement system MS measures a sheet. For example, the thickness of the sheet is measured. Examples of the sheet include paper, resin, and a battery electrode sheet. The frame devices 2 and the sensor devices 3 used for measuring the sheet will be described with reference to FIG. 2.

Figure 2:
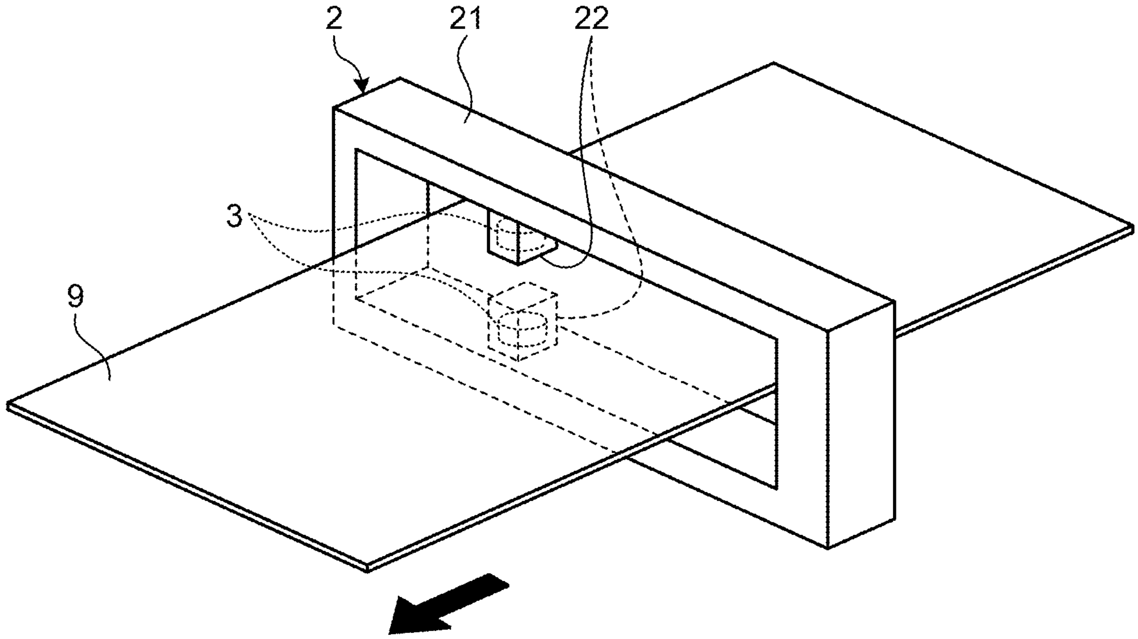
FIG. 2 illustrates an example of schematic configurations of a frame device 2 and a sensor device 3.

FIG. 2 illustrates an example of schematic configurations of a frame device 2 and a sensor device 3. A sheet to be measured is referred to as a sheet 9 in the figure. The sheet 9 is placed in a manufacturing process, and conveyed in a direction indicated by a black arrow. Examples of the manufacturing process include a coating process and a drying process.

The frame device 2 is provided such that the sheet 9 passes through the inside thereof. FIG. 2 illustrates a frame 21 and sensor heads 22, which are components of the frame device 2, by attaching reference numerals. The frame 21 has a shape of a ring through which the sheet 9 can pass. The frame 21 as described above is also referred to as an O-type frame or the like. In this example, a pair of sensor heads 22 are arranged on opposite sides across the sheet 9, and supported by being, for example, moored to the frame 21. The sensor heads 22 scans the sheet 9 by moving in the frame in a direction intersecting with (e.g., direction orthogonal to) the direction of conveyance of the sheet 9. The sensor heads 22 are driven by, for example, an actuator (e.g., motor) (not illustrated).

The sensor device 3 is mounted on the frame device 2, more specifically, the sensor heads 22 of the frame device 2. The sensor device 3 includes, for example, a source of radiation such as B-rays and X-rays and a radiation detector. The radiation source of the sensor device 3 is mounted on one sensor head 22, and the radiation detector of the sensor device 3 is mounted on the other sensor head 22. Radiation from one sensor head 22 passes through the sheet 9, and is detected at the other sensor head 22. This causes a transmission amount and an attenuation amount (which may be transmittance and attenuation rate) of radiation transmitted through the sheet 9 to be detected. The thickness of the sheet 9 is calculated based on a calibration curve indicating the relation between the transmittance and the like of the sheet 9 and the thickness of the sheet 9.

For example, a plurality of frame devices 2 mounted with sensor devices 3 as described above is arranged at positions before and after a process of coating the sheet 9, positions before and after a process of drying the sheet 9, and the like. The thickness of the sheet 9 is measured at the positions.

Returning to FIG. 1, the frame device 2 includes an arithmetic unit 23 in addition to the frame 21 and the sensor heads 22 described above. The arithmetic unit 23 performs an arithmetic operation based on a detection result from the sensor device 3 mounted on the sensor heads 22 of the frame device 2. For example, an arithmetic operation is performed for calculating the thickness of the above-described sheet 9. The arithmetic unit 23 may include a circuit of dedicated design, or may include a general-purpose processor.

Device setting is performed for each of the plurality of devices 1 including the frame devices 2 and the sensor devices 3 described above. There are various device settings (items) in accordance with the types of the devices 1. Examples of device settings of the frame devices 2 include setting of correction data for distortion and the like and setting of a scanning profile. Examples of device settings of the sensor devices 3 include setting of a sampling period.

The configuration of the measurement system MS is specified by a combination of device settings, arrangement places, and the like of the plurality of devices 1. The configuration is also referred to as a system configuration including the plurality of devices 1.

The system configuration is changed in accordance with a measurement purpose and the like. In changing the system configuration, for example, replacement of a processor of the frame device 2, replacement and addition of the sensor device 3, and the like, such as replacement and addition of a device 1 are performed. In that case, a change in device setting of the device 1 is required.

Conventionally, a necessary change of device setting has been manually made each time the system configuration was changed. For example, a worker or an operator manually has switched a DIP switch of the device 1, or has operated the management device 4 for device setting. Changing many items of device setting manually one by one takes work time, and a human-made operation may cause a mistake. In contrast, in the embodiment, the management device 4 to be described later automatically makes the necessary change of device setting.

Returning to the description of the management system 100, the management device 4 can communicate with each of the plurality of devices 1, and manages the plurality of devices 1. The communication may be performed in a wired or wireless manner. The management device 4 is a measurement operator station that can be operated by an operator. The management device 4 includes an acquisition unit 41, an arithmetic unit 42, a system configuration setting unit 43, and a storage unit 44. A database 441 is exemplified as information stored in the storage unit 44.

The acquisition unit 41 acquires a detection result from each of the plurality of sensor devices 3. For example, the detection result from a sensor device 3 is acquired directly using communication between the sensor device 3 and the management device 4 or indirectly using communication between a frame device 2 mounted with the sensor device 3 and the management device 4. The acquisition unit 41 may acquire an arithmetic result from an arithmetic unit 23 of the frame device 2.

The acquisition unit 41 acquires an identification ID of each of the plurality of devices 1. A method of acquiring the identification ID is not particularly limited. For example, when the identification ID is stored in a device 1, the identification ID may be acquired by using communication between the device 1 and the management device 4. When the identification ID is included in the appearance of the device 1, the identification ID may be acquired by using a captured image of the device 1 and the like. The acquisition unit 41 may include an imaging function and an image recognition function necessary for the acquisition.

The acquisition unit 41 acquires information on an arrangement place of each of the plurality of devices 1 in the measurement system MS. The acquisition of the information on an arrangement place is also simply referred to as acquisition of an arrangement place. For example, the arrangement place of the frame device 2 may be identified by the number of the frame device 2 or the like. The arrangement place of a sensor device 3 may be identified by a sensor head 22 of a frame device 2 or the like. A method of acquiring an arrangement place is not particularly limited. For example, when information on an arrangement place is stored in a device 1, the arrangement place of the device 1 may be acquired by using communication between the device 1 and the management device 4. The arrangement place of the device 1 may be acquired by using a captured image of the device 1 arranged in the measurement system MS or the like.

The acquisition unit 41 acquires (information on) the current device setting of each of the plurality of devices 1. For example, the current device setting of the device 1 is acquired by using communication between the device 1 and the management device 4.

The arithmetic unit 42 performs an arithmetic operation based on a detection result from each of the plurality of sensor devices 3, which has been acquired by the acquisition unit 41. For example, various arithmetic operations are performed based on measurement results of the sheet 9 at the frame devices 2.

The system configuration setting unit 43 sets a system configuration including the plurality of devices 1. As described above, the system configuration is the configuration of the measurement system MS, and is specified by the device setting, the arrangement place, and the like of each of the plurality of devices 1.

The system configuration setting unit 43 changes the device setting of at least one of the plurality of devices 1 based on an acquisition result of the acquisition unit 41. For example, a command or the like for changing the device setting is transmitted from the management device 4 to the corresponding device 1, and the device 1 makes device setting for the device 1 itself.

In the embodiment, the system configuration setting unit 43 changes the device setting by referring to the database 441 stored in the storage unit 44. The database 441 will be described with reference to FIG. 3.

FIG. 3 illustrates an example of the database 441. In this example, the database 441 describes an identification ID, an arrangement place, device setting, and other information in association with each other.

The identification ID indicates an identification ID of a device 1. FIG. 3 schematically illustrates the identification ID as the frame device 2-1 or the like.

The arrangement place indicates an arrangement place of the device 1 in the measurement system MS. Various places where the device 1 can be arranged are associated with the device 1.

The device setting indicates device setting of the device 1. Various device settings that can be set for one device 1 are associated with the device 1. Device setting is uniquely determined for a combination of an identification ID and an arrangement place. That is, the database 441 describes the combination of an identification ID and an arrangement place and the device setting in association with each other.

The other information may include any information other than the above. A frame type and a motor type are exemplified as other information of a frame device 2. A radiation source type and the presence or absence of temperature control are exemplified as other information of a sensor device 3.

Returning to FIG. 1, the system configuration setting unit 43 compares the identification ID, the arrangement place, and the current device setting of each of the devices 1 indicated in the acquisition result of the acquisition unit 41 with the database 441, and searches for a device 1 for which device setting is not made as indicated in the database 441. Such a device 1 is also referred to as a device 1 that needs a setting change.

When finding the device 1 that needs a setting change, the system configuration setting unit 43 reads device setting of the device 1 indicated in the database 441 from the database 441. Then, the system configuration setting unit 43 changes the device setting of the device 1 so that the device 1 has the device setting read from the database 441. For example, in this manner, the device setting of the device 1 that needs a setting change is automatically changed.

Note that setting made by the system configuration setting unit 43 may include setting of a measurement sequence. Examples of the measurement sequence include a sequence in a case of the frame device 2, and specifically include sequences in a measurement state in which measurement is performed and a standby state in which measurement is not performed. For example, a command is sent from the management device 4 to each of the frame devices 2 so that each of the frame devices 2 performs measurement in accordance with the set measurement sequence.

According to the management system 100 described above, a necessary change of device setting is automatically made. Therefore, a workload accompanying device setting can be reduced. Manual device setting is unnecessary, and a mistake caused by a human-made operation is avoided. There are also advantages such as improvement in product quality, reduction in labor costs, and reduction in lead time caused by completing the device setting in a short time.

Figure 4:
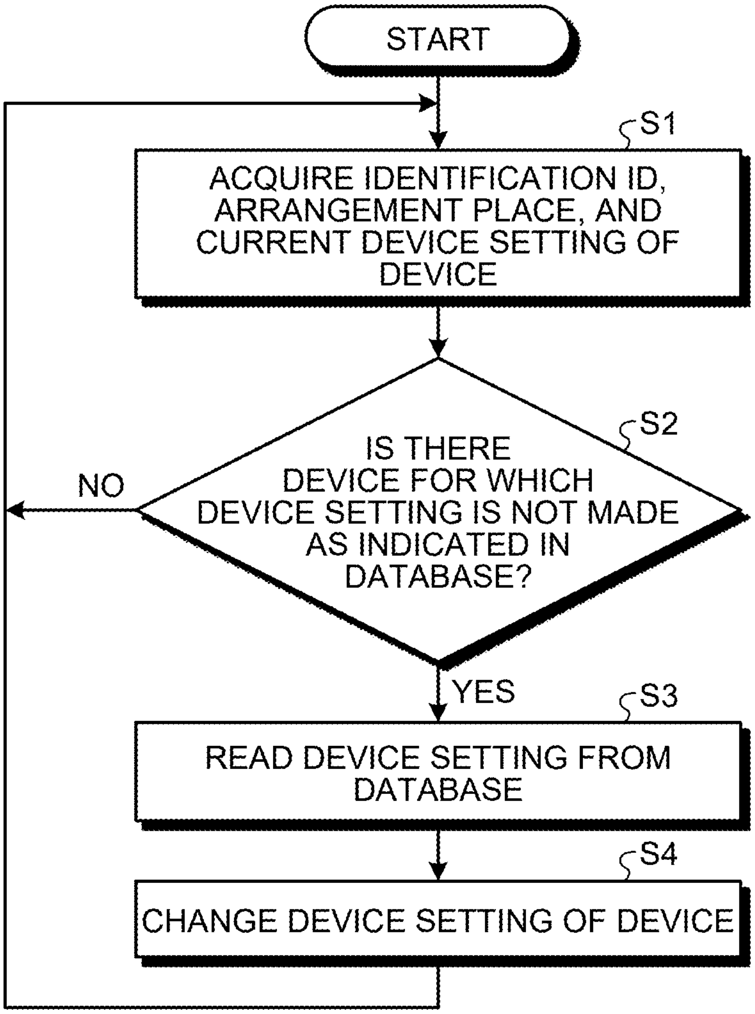
FIG. 4 is a flowchart illustrating an example of processing (management method) executed in the management system 100.

FIG. 4 is a flowchart illustrating an example of processing (management method) executed in the management system 100. Since specific processing has been described so far, detailed description will be omitted.

In Step S1, an identification ID, an arrangement place, and the current device setting of a device are acquired. The acquisition unit 41 of the management device 4 acquires an identification ID, an arrangement place, and the current device setting of each of the plurality of devices 1.

In Step S2, it is determined whether or not there is a device for which device setting is not made as indicated in the database. The system configuration setting unit 43 of the management device 4 determines whether or not there is a device 1 having device setting different from device setting indicated in the database 441, that is, a device 1 that needs a setting change among the plurality of devices 1. When there is the device 1 that needs a setting change (Step S2: Yes), processing proceeds to Step S3. Otherwise (Step S2: No), the processing returns to Step S1.

In Step S3, device setting is read from the database. The system configuration setting unit 43 of the management device 4 reads, from the database 441, the device setting of the device 1 that needs a setting change, which has been found in Step S2 above.

In Step S4, the device setting of the device is changed. The system configuration setting unit 43 of the management device 4 changes the device setting of the device 1 so that the device 1 that needs a setting change, which has been found in Step S2 above, has device setting read from the database 441 in Step S3 above. Thereafter, the processing returns to Step S1.

For example, the processing of the flowchart as described above is repeatedly executed at a predetermined cycle. When the device 1 is, for example, replaced or added in the measurement system MS, a device 1 that needs a setting change is generated. The fact is detected in the processing of Step S2. The device setting of the device 1 that needs a setting change is changed by the processing in Steps S3 and S4.

<First Variation>

The disclosed technique is not limited to that in the above-described embodiment. Some variations will be described. For example, a part or all of the function of the management device 4 may be provided in a device or a system outside the measurement system MS. Examples of the external device include an external PC and an on-site PC. Examples of the external system include a cloud system. An example in which an external device is used will be described with reference to FIG. 5.

Figure 5:
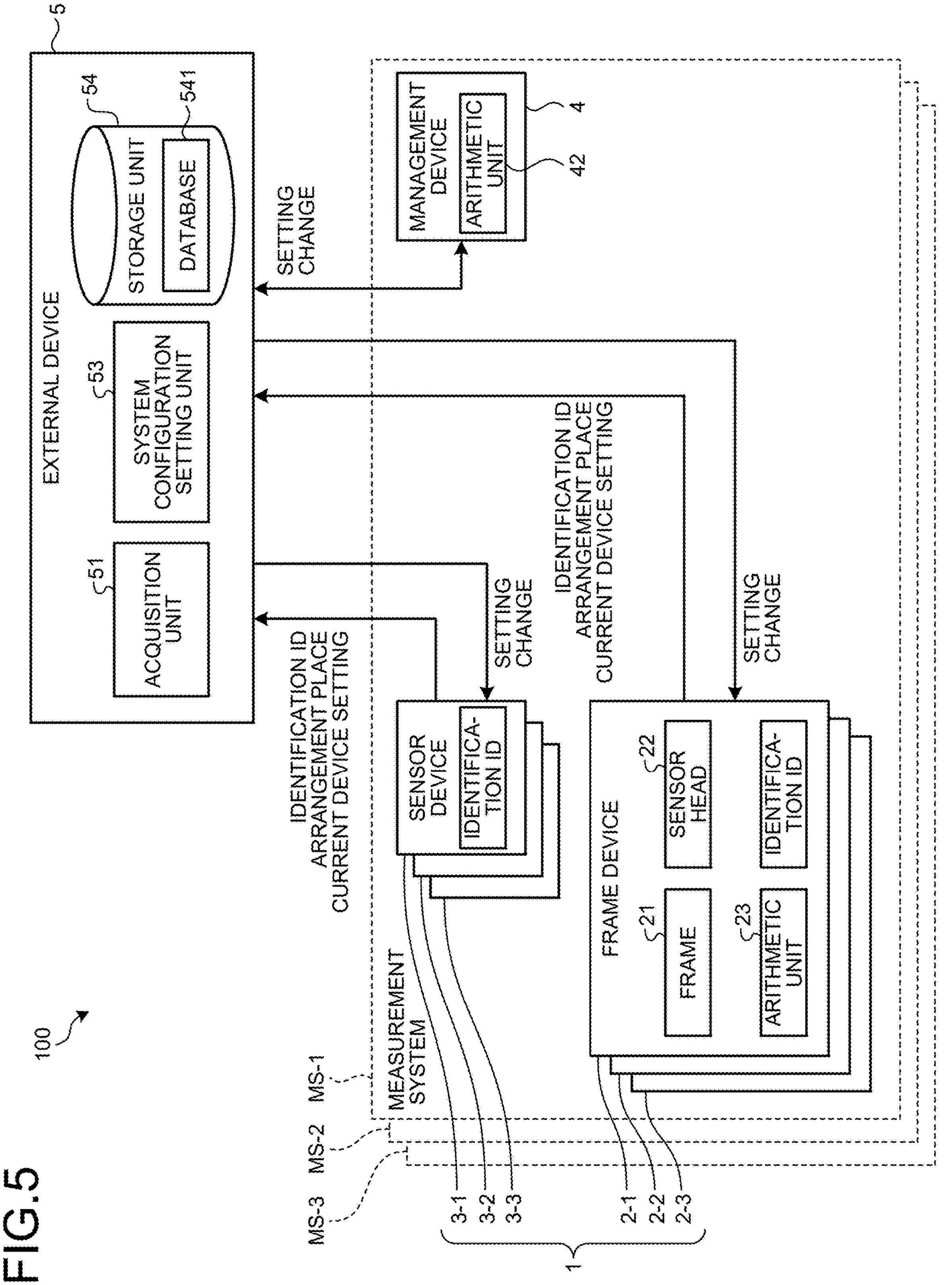
FIG. 5 illustrates a variation.

FIG. 5 illustrates a variation. The management system 100 includes an external device 5. The external device 5 has a part of the function of the management device 4 in the measurement system MS. In this example, the external device 5 has functions of the acquisition unit 41 of the management device 4, the system configuration setting unit 43, and the storage unit 44 in FIG. 1 described above. The storage unit 44 stores the database 441.

The external device 5 can communicate with each of the plurality of devices 1 and the management device 4. The external device 5 includes an acquisition unit 51, a system configuration setting unit 53, and a storage unit 54. A database 541 is exemplified as information stored in the storage unit 54. Basic functions and applications thereof are similar to those of the acquisition unit 41, the system configuration setting unit 43, the storage unit 44, and the database 441 of the management device 4 described above with reference to FIG. 1, and detailed description thereof will thus not be repeated. Note that a part of the function of the external device 5 may overlap the function of the management device 4. For example, the external device 5 may include an arithmetic unit. The arithmetic unit may have the function of the arithmetic unit 42 of the management device 4.

In an example in FIG. 5, an instruction to change device setting can be given to the external device 5 by operating the management device 4. When such an instruction is sent from the management device 4 to the external device 5, the system configuration setting unit 53 of the external device 5 changes the device setting of the device 1 that needs a setting change. For example, after performing an operation such as replacement of the device 1 in the measurement system MS, the worker and the operator can cause the external device 5 to change the device setting immediately after operating the management device 4.

In the example in FIG. 5, the plurality of devices 1 constitutes a plurality of measurement systems MS. Specifically, three measurement systems MS are exemplified as measurement systems MS-1 to MS-3. These measurement systems MS may be present in the same region, for example, in the same factory. The system configuration setting unit 53 of the external device 5 sets a system configuration including the plurality of devices 1 for each of the plurality of measurement systems MS. The database 541 referred to in that case will be described with reference to FIG. 6.

FIG. 6 illustrates an example of the database 541. In this example, the database 541 describes a measurement system, an identification ID, an arrangement place, device setting, and other information in association with each other. The measurement system indicates a measurement system MS, and is schematically illustrated as a measurement system MS-1 or the like.

Device setting is uniquely determined for a combination of a measurement system MS, an identification ID, and an arrangement place. That is, the database 541 describes the combination of a measurement system MS, an identification ID, and an arrangement place and the device setting in association with each other. The system configuration setting unit 53 changes the device setting by referring to the database 541.

The management system 100 including the external device 5 as described above also automatically makes the necessary change of device setting, which can reduce a workload accompanying the device setting. Furthermore, the database 541 is stored in the storage unit 54 of the external device 5, so that pieces of information of the plurality of measurement systems MS can be collectively stored and centrally managed. A backup is easily created.

Referring again to FIG. 1, in the embodiment, communication including acquisition of identification IDs of the plurality of devices 1 may be performed. For example, communication between the plurality of sensor devices 3 enables an arithmetic operation based on detection results from the plurality of sensor devices 3. At least some of the sensor devices 3 may include an arithmetic unit that performs such an arithmetic operation. An arithmetic unit 23 of a frame device 2 mounted with a sensor device 3 may perform such an arithmetic operation. Furthermore, the communication between the plurality of frame devices 2 enables synchronization control of measurement timings (e.g., drive timings of sensor heads 22) of the frame devices 2. For example, a load of control, an arithmetic operation, and the like in the management device 4 can be reduced and a degree of freedom of design of the measurement system MS can be improved by allowing the plurality of devices 1 to cooperate with each other to perform various controls, arithmetic operations, and the like on the devices 1.

In communication between the plurality of devices 1 and the management device 4, some of the plurality of devices 1 may function as base devices, and the remaining devices 1 may function as extension devices. Communication between an extension device and the management device 4 may be performed via a base device. The device setting of each of the devices 1 can be changed by using a communication method of a base-extension relation.

The technique described above is identified as follows, for example. One of the disclosed techniques is the management system 100. As described with reference to FIG. 1 and the like, the management system 100 includes the plurality of devices 1, the acquisition unit 41, and the system configuration setting unit 43. The plurality of devices 1 constitutes the measurement system MS. The acquisition unit 41 acquires an identification ID and an arrangement place of each of the plurality of devices 1. The system configuration setting unit 43 changes the device setting of at least one of the plurality of devices 1 based on an acquisition result of the acquisition unit 41.

According to the above-described management system 100, a change of the device setting of the device 1 is automatically made. Therefore, a workload accompanying device setting can be reduced.

As described with reference to FIGS. 1 and 3 and the like, the system configuration setting unit 43 may change the device setting of at least one device 1 by referring to the database 441 that describes a combination of the identification ID of the device 1 and the arrangement place of the device 1 and the device setting of the device 1 in association with each other. In that case, the system configuration setting unit 43 may change the device setting of a device 1 for which device setting is not made as indicated in the database 441 among the plurality of devices 1. For example, in this manner, the device setting of the device 1 that needs a setting change can be changed.

As described with reference to FIGS. 5 and 6 and the like, the plurality of devices 1 may constitute the plurality of measurement systems MS. The system configuration setting unit 53 may change the device setting of at least one device 1 by referring to the database 541 that describes the identification ID of the device 1, the arrangement place of the device 1, and the device setting of the device 1 in association with each other for each of the plurality of measurement systems MS. This enables the device setting of the device 1 to be changed even when there is the plurality of measurement systems MS. Furthermore, information of each of the plurality of measurement systems MS can be centrally managed in the database 541.

As described with reference to FIG. 2 and the like, the management system 100 may measure the sheet 9. The plurality of devices 1 may include a frame device 2 provided such that the sheet 9 passes through the inside thereof and a sensor device 3 mounted in the frame device 2. For example, such device settings of the frame devices 2 and the sensor devices 3 can be automatically changed.

The management method described with reference to FIG. 4 and the like is also one of the disclosed techniques. The management method includes acquiring information of an identification ID and an arrangement place of each of the plurality of devices 1 constituting the measurement system MS (Step S1) and changing the device setting of at least one of the plurality of devices 1 based on the acquisition result (Step S4). As described above, a workload accompanying device setting can be reduced also by such a management method.

REFERENCE SIGNS LIST

100 MANAGEMENT SYSTEM
1 DEVICE
2 FRAME DEVICE
21 FRAME
22 SENSOR HEAD
23 ARITHMETIC UNIT
3 SENSOR DEVICE
4 MANAGEMENT DEVICE
41 ACQUISITION UNIT
42 ARITHMETIC UNIT
43 SYSTEM CONFIGURATION SETTING UNIT
5 EXTERNAL DEVICE
51 ACQUISITION UNIT
53 SYSTEM CONFIGURATION SETTING UNIT
54 STORAGE UNIT
541 DATABASE

The invention claimed is:

1. A management system comprising:

a plurality of devices constituting a measurement system;

the management system being configured to:

acquire information of an identification ID and an arrangement place of each of the plurality of devices to provide an acquisition result; and change a device setting of at least one of the plurality of devices based on the acquisition result;

wherein management system changes the device setting of at least one of the plurality of devices by referring to a database that describes a combination of an identification ID of the device and an arrangement place of the device and the device setting of the device in association with each other; and wherein the management system executes a processing for changing the device setting of a device for which the device setting is not set as indicated in the database and does not execute a processing for changing the device setting of a device for which the device setting is set as indicated in the database.

2. The management system according to claim 1, wherein the plurality of devices constitutes a plurality of measurement systems, and the management system changes the device setting of at least one of the plurality of devices by referring to a database that describes an identification ID of a device, an arrangement place of the device, and device setting of the device in association with each other for each of the plurality of measurement systems.

3. The management system according to claim 1, wherein the measurement system measures a sheet, and the plurality of devices includes:

a frame device provided such that the sheet passes through an inside of the frame device; and a sensor device mounted in the frame device.

4. A management method comprising the steps of:

acquiring information of an identification ID and an arrangement place of each of a plurality of devices constituting a measurement system;

changing a device setting of at least one of the plurality of devices based on an acquisition result;

changing the device setting of at least one of the plurality of devices by referring to a database that describes a combination of an identification ID of a device and an arrangement place of the device and device setting of the device in association with each other; and executing a processing for changing the device setting of a device for which the device setting is not set as indicated in the database and not executing a processing for changing device setting of a device for which the device setting is set as indicated in the database.

5. A management method comprising the steps of:

measuring a sheet;

providing a plurality of devices that constitute a measuring system, the plurality of devices including a frame and a sensor, the frame being provided such that a sheet to be measured passes through an inside of the frame, the sensor being mounted in the frame and serving to measure the sheet;

acquiring information of an identification ID and an arrangement place of each of the plurality of devices to provide an acquisition result;

changing a device setting of at least one of the plurality of devices based on the acquisition result.

6. A management system comprising a plurality of devices constituting a measurement system, the management system being configured to:

acquire information of an identification ID and an arrangement place of each of the plurality of devices to provide an acquisition result; and change device setting of at least one of the plurality of devices based on the acquisition result;

wherein the measurement system measures a sheet, and the plurality of devices includes:

a frame device provided such that the sheet passes through an inside of the frame device; and a sensor device mounted in the frame device.

7. The management system according to claim 6, wherein the management system changes the device setting of at least one of the plurality of devices by referring to a database that describes a combination of an identification ID of a device and an arrangement place of the device and device setting of the device in association with each other.

8. The management system according to claim 6, wherein the plurality of devices constitutes a plurality of measurement systems, and the management system changes the device setting of at least one of the plurality of devices by referring to a database that describes an identification ID of a device, an arrangement place of the device, and device setting of the device in association with each other for each of the plurality of measurement systems.

9. The management system according to claim 7, wherein the management system changes device setting of a device for which device setting is not made as indicated in the database among the plurality of devices.

* * * * *